US007089302B1

(12) United States Patent
Churchyard et al.

(10) Patent No.: US 7,089,302 B1
(45) Date of Patent: Aug. 8, 2006

(54) METHOD AND SYSTEM FOR MAINTAINING A COMMUNICATIONS PROTOCOL SESSION

(75) Inventors: Peter J. Churchyard, Mt. Airy, MD (US); William P. Supernor, Falls Church, VA (US)

(73) Assignee: McAfee, Inc., Santa Clara, CA (US)

( * ) Notice: Subject to any disclaimer, the term of this patent is extended or adjusted under 35 U.S.C. 154(b) by 1466 days.

(21) Appl. No.: 09/650,729

(22) Filed: Aug. 30, 2000

(51) Int. Cl.
G06F 15/16 (2006.01)
G06F 15/173 (2006.01)

(52) U.S. Cl. ............ 709/224; 709/203; 709/218; 709/228

(58) Field of Classification Search ........... 709/203, 709/230, 202, 237
See application file for complete search history.

(56) References Cited

U.S. PATENT DOCUMENTS

| | | | | |
|---|---|---|---|---|
| 5,623,600 A | * | 4/1997 | Ji et al. | 713/201 |
| 5,862,326 A | * | 1/1999 | Bapat | 709/203 |
| 6,130,889 A | * | 10/2000 | Feldman et al. | 370/397 |
| 6,259,538 B1 | * | 7/2001 | Amit et al. | 358/442 |
| 6,341,349 B1 | * | 1/2002 | Takaragi et al. | 713/168 |
| 6,598,034 B1 | * | 7/2003 | Kloth | 706/47 |
| 6,615,349 B1 | * | 9/2003 | Hair | 713/165 |

FOREIGN PATENT DOCUMENTS

WO    WO 99/26161    5/1999

* cited by examiner

*Primary Examiner*—Rupal Dharia
*Assistant Examiner*—Quang N. Nguyen
(74) *Attorney, Agent, or Firm*—Zilka-Kotab, PC; Christopher J. Hamaty

(57) ABSTRACT

A method and system is disclosed for maintaining a communications protocol session between a client and server during times of inactivity at the client caused by other processing in the data path following a request by the client. For various client processes that may expire after a specified amount of inactivity during a particular session, an agent of the client in the data path can send a response containing illusory content to the client that causes the client to maintain the current session. The process at the client can ignore this illusory content response but, by processing it, the communications path session between the client and server can be maintained.

16 Claims, 5 Drawing Sheets

METHOD AND SYSTEM FOR MAINTAINING A COMMUNICATIONS PROTOCOL SESSION

BACKGROUND

1. Field of the Invention

This invention generally relates to sustaining connections within communications networks. More specifically, the invention relates to maintaining a communications protocol session in a client/server architecture during periods of non-activity at the client.

2. Description of the Related Art

In a distributed communications network, a user of a computer desiring to use the network (the "client" computer) will ultimately be connected during a session via a communications protocol to another computer (the "server" computer) in order for the client to utilize resources that may be available at the server. In typical communications network deployments, additional computers may serve as agents of the client as part of the communications path. For example, computer network 100 shown in FIG. 1 can contain agents such as proxies 110 and 160, and firewalls 120 and 150. In network 100, data travelling between client 130 and server 140 can first travel through proxy 110 and firewall 120, before reaching data communications network 190 (such as the Internet). Prior to reaching server 140, the data travels first through firewall 150 and proxy 160.

Data communication protocols allow client 130 and server 140 to communicate with each other over communications network 190. For example, the well known Internet Protocol (IP), as described in Request for Comment (RFC) 791 (INTERNET PROTOCOL, DARPA INTERNET PROGRAM PROTOCOL SPECIFICATION, dated September 1981), and the well known Transmission Control Protocol (TCP) as described in RFC 793 (TRANSMISSION CONTROL PROTOCOL, DARPA INTERNET PROGRAM PROTOCOL, SPECIFICATION, dated September 1981) (together known as TCP/IP) can provide the necessary mechanisms that allow communications to pass between computers and other data processing devices using the Internet. Similarly, the well known Hypertext Transfer Protocol (HTTP), as described in RFC 2616 (HYPERTEXT TRANSFER PROTOCOL—HTTP/1.1), can provide the ability for communications to occur between clients and servers using the World Wide Web (WWW or Web).

Certain processes that may occur at an agent of an entity communicating over a communications network can take a significant amount of time to complete. For example, activities related to checking for viruses (such as scanning a file requested by a client) can take a significant amount of time while executing at a firewall. While such activity takes place, the client machine may not sense any network activity and may incorrectly determine that the communications session has been terminated. For example, a lack of activity could be incorrectly perceived as a situation where the server has crashed or is otherwise not responding.

Mechanisms have existed in the past for preserving network connections during periods of inactivity between the server and the client. For example, International Patent Application WO 99/26161 entitled "Controlled Distribution of Application Programs in a Computer Network", assigned to Trend Micro, Inc., discloses a method for establishing a bidirectional communications link between a proxy and a client. The bidirectional link can then be used to provide a status to the client during any time-consuming server operations. However, this solution utilizes a separate software module that is downloaded from the server to the client. In a non-secure environment, this type of approach could introduce viruses or other malicious processes. In addition, this type of approach would consume resources on the client machine. Furthermore, in some network configurations (for example, those involving firewalls), a separate software module might be blocked from being received by the client.

Consequently, a need exists for a data network system that overcomes the foregoing drawbacks. In particular, a method is needed for maintaining a communications protocol session between a client and a server during periods when time consuming processes are executed at agents of the client, without the dangers and disadvantages associated with downloading a separate piece of software.

SUMMARY OF THE INVENTION

In accordance with this invention, a data communications protocol session between a client and a server in a data communications network can be maintained, even when time-consuming activities may occur within various agents of the client. For example, a firewall may perform virus scanning for the client on one or more files that the client may have requested from the server. In some cases, particularly if one or more of the requested files are large in size, such an activity may take a significant amount of time. For some clients, this could result in an erroneous time out error, where the client incorrectly perceives the substantial delay as a non-response from the server.

When an agent determines that a particular operation may result in a time out by the client, the agent can send illusory content to the client that will cause the client to continue waiting for the actual response. This illusory content prevents the client from erroneously terminating the current operation, while at the same time preventing the client from interpreting the illusory content as the actual response to the request.

In one embodiment, an agent can prepare a response message that contains an application specific entity-header. The entity header would be particular to the software running at that agent. Such a use of an entity header can cause the client to maintain the connection to the server, waiting for a response.

DETAILED DESCRIPTION

The present invention can allow an agent of a client in a client-server communications network to prevent erroneous termination of processing at the client that can occur during processing by the agent. By utilizing illusory content, the agent can sustain the communications session with the client and prevent a time out from occurring. The illusory content causes the client to not terminate the current communication session, while at the same time preventing the client from interpreting the illusory content as an actual response.

Figure 1:
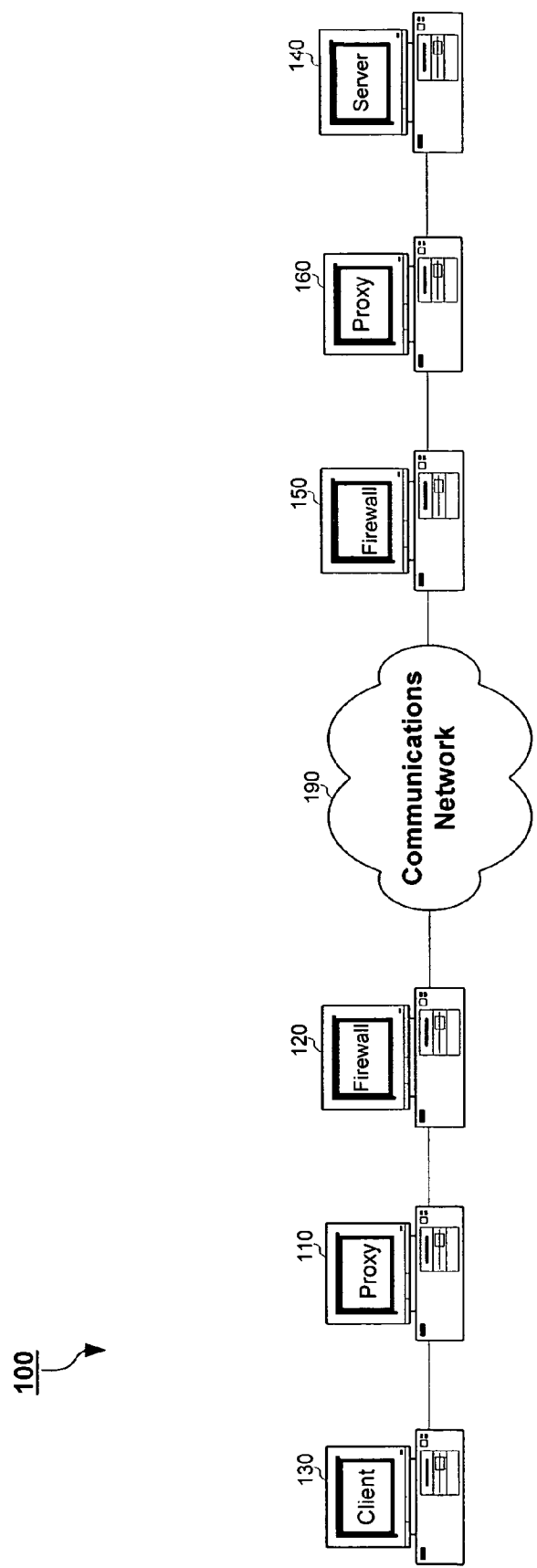
FIG. 1 is a block diagram of a system according to the prior art for allowing data to travel between a client and a server over a communications network.
Figure 2:
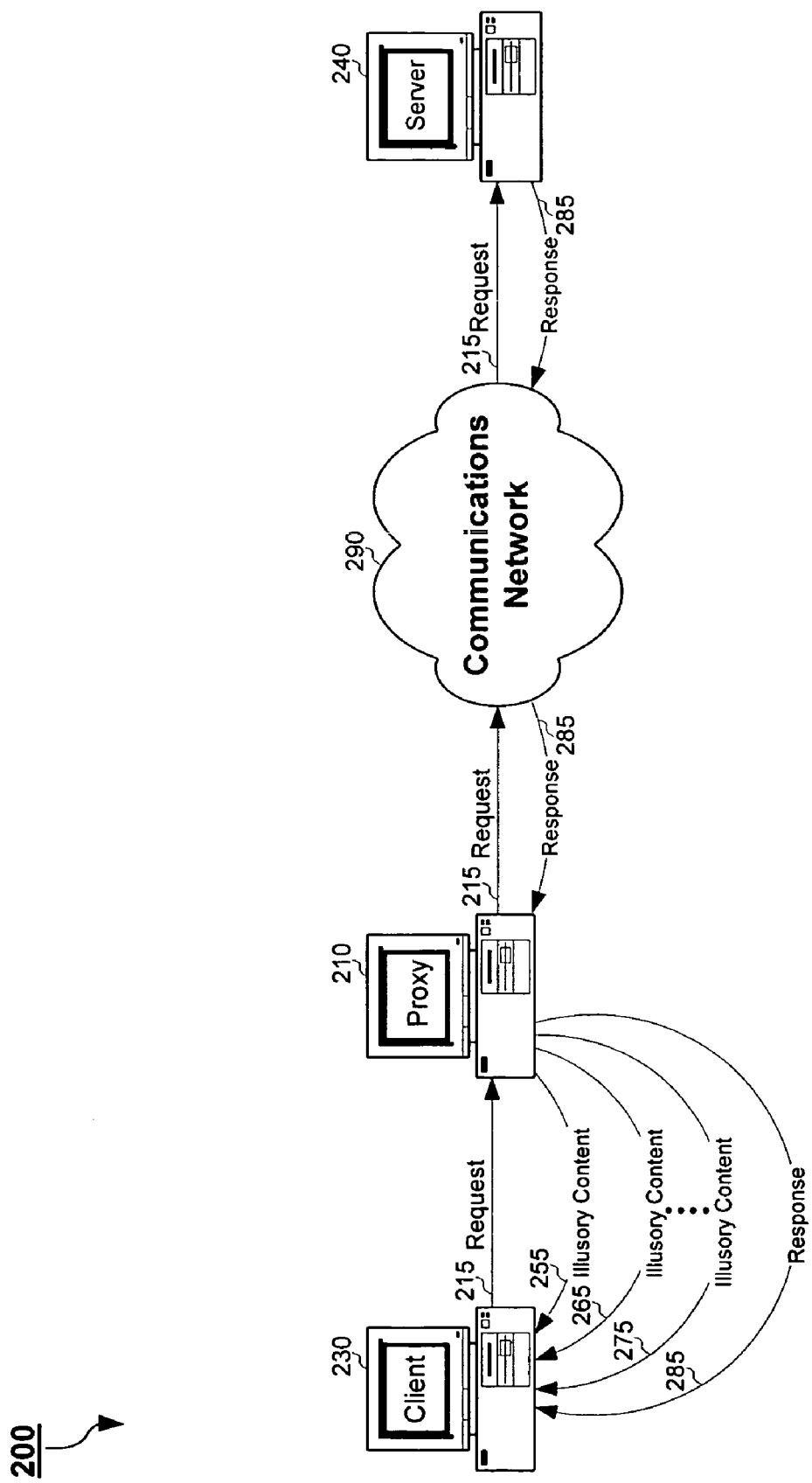
FIG. 2 depicts a system according to the present invention.

FIG. 2 depicts a block diagram of an embodiment of the present invention showing a system 200 in which communications can occur between a client 230 and a server 240 over communications network 290. In general, client 230 can initiate a communications session with server 240 by sending request 215. For example, a user at client 230 may desire a particular file that the user might have found as a result of implementing a search for a data file on the Web. In particular, the user might want to download a large data file (such as a document or a video file).

The user of client 230 may request that the data file be downloaded to client 230 by sending request 215 to proxy 210. Proxy 210 can then transmit that request to server 240 via communications network 290. Upon deciding that the user of client 230 may receive the requested data file, server 240 can send response 285 via communications network to proxy 210.

Prior to sending the requested data file on to client 230, proxy 210 may perform additional processing. For example, proxy 210 may scan all files that it receives to avoid harmful or intrusive mechanisms, such as viruses, worms, or Trojan Horses. In other embodiments, proxy 210 may perform other content-scanning activities, such as searching for occurrences of certain text phrases in a file. Still other activities that could be performed at proxy 210 include, for example, (a) translating the content of a file from one language to another, (b) encrypting or decrypting the content of a file, or (c) verifying a public key digital signature that may have been applied to a file.

While performing such additional processing, client 230 could mistakenly terminate the current communications session initiated by the sending of request 215, by misinterpreting the delay in receiving a response (that would result from the additional processing in proxy 210) as a nonresponsive server. For example, when using the well known Internet Explorer browser for the Web, a request that does not receive a response in a particular amount of time (e.g. five minutes) will expire (or "time out").

In order to prevent such a time out, proxy 210 can first determine if such a time out will occur, by, for example, knowing what type of web browser is in use at the client. Then proxy 210 can send a response to the request from client 230 that will cause client 230 to continue waiting for a valid response message to the request. The response is generally operative to prevent client 230 from interpreting a lack of response from the server as an error, but also prevents client 230 from not interpreting the response as a valid response to the previously sent request. In this manner, the response can be referred to as illusory content. This illusory content can cause client 230 to continue waiting for a valid response from the server, thus preventing the premature expiration of the communications session initiated by request 215 from the user of client 230.

In general, although illusory content will be in conformance with the particular communications protocol in use, the illusory content may convey no meaning. In one embodiment, this will permit the illusory content to be recognized by the various entities in the communications network, but only to the extent that the illusory content should be sent on to the next entity. Thus, as further discussed with reference to FIG. 5 below, if the entity receiving the illusory content is a client, the illusory content can simply be ignored, and if the entity is an intermediate agent, the illusory content will simply be passed through.

For example, upon receiving response 285 and then commencing additional processing, proxy 210 may send illusory content 255 to client 230 after determining that the additional processing may not complete until after client 230 expects a response. Further, proxy 210 may send additional instances of illusory content to client 230, including, for example, illusory content 265 through illusory content 275, until proxy 210 completes its additional processing and can then transmit response 285. Since the amount of time in which client 230 may time out is known, the amount of time between instances of illusory content can be fixed at a threshold that is less than the time out value. For example, when using the Internet Explorer software package (made by Microsoft Corporation of Redmond, Wash.) as client 230, a time out will occur in client 230 if a response is not received within a particular amount of time (e.g., five minutes) from the initial request. Thus, the amount of time sent between instances of illusory content can be set to a value less than that particular amount of time.

Figure 3:
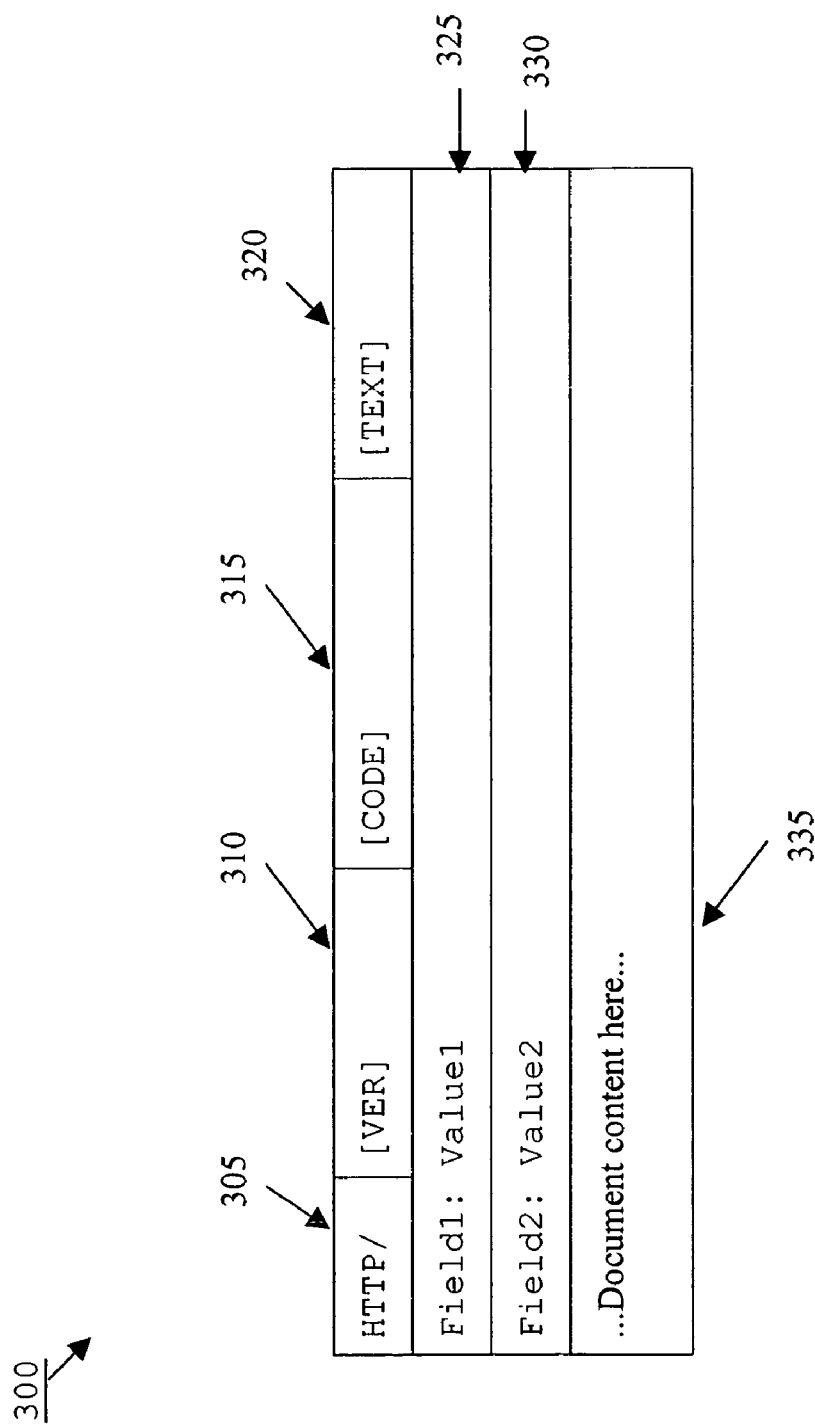
FIG. 3 depicts a response message in the HTTP communications protocol.

FIG. 3 depicts a general response message 300, formatted according to the well known Hypertext Transmission Protocol (HTTP). As described above, a client can send a request to a server and the server can then return a response. When a server receives an HTTP request, it can locate the appropriate information being requested and return that information (or, alternatively, may return an error message). The HTTP response that it returns must have a particular form in order to be understood by the client.

The first line of response message 300 can include several fields, including HTTP designator 305, HTTP version 310, status code 315, and a human readable text message 320 corresponding to status code 315. The first line can be followed by header lines 325 and 330, which can contain information about the requested document. In general, a response message can contain as many header lines as required for the particular communication between the client and the server. The headers can end with a blank line, followed by document content 335.

Figure 4:
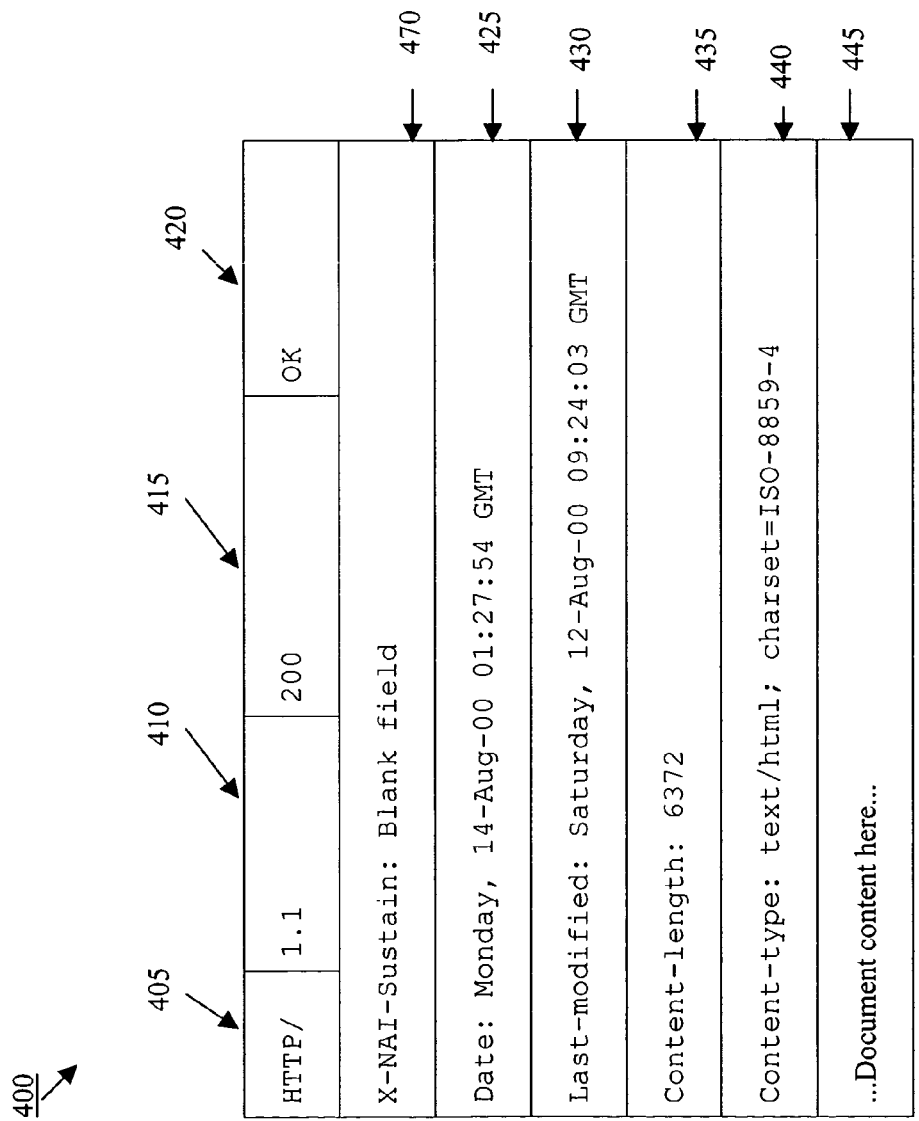
FIG. 4 depicts a response message used in an embodiment of the present invention.

FIG. 4 depicts an example response message 400 according to an embodiment of the present invention. The first line contains HTTP designator 405, HTTP version 410, response code 415, and human-readable text 420, as described above with respect to FIG. 3. Header 470 can contain an entity-header, as described in further detail below. Header 425 can contain the date that the particular message was sent and header 430 can contain the date that the content (i.e. file, in this example) was last modified. Header 435 can contain the size of the document in bytes and header 440 can contain an indication of the content type. The content-type field 440 can be used by a web browser to indicate the format of the received document, whose content can be in field 445. For example, HTML content can be identified with "text/html", ordinary text can be identified with "text/plain", and a Graphics Interchange Format (GIF) image can be identified with "image/gif".

In general, header fields can contain a number of different types of metainformation, as described in RFC 2616. In particular, the metainformation can include information about the resource identified in the request message. Header fields may also be extended to allow for additional entity-header fields, also as defined in RFC 2616. These entity-header fields allow the protocol to be extended to meet the particular needs of a particular entity, but it is important to note that it cannot be assumed that the recipient of a message containing a user-defined entity-header will be able to recognize such a header. RFC 2616 specifically states that unrecognized header fields should be ignored by the recipient and must be forwarded by transparent proxies.

In FIG. 4, entity-header 470 exemplifies a header that can allow the response to be used as illusory content. In particular, the "X-NAI-Sustain" label is not a part of the HTTP standard. Although it may be an unrecognized header to certain entities within the communications network, the response containing the unrecognized header will be transmitted on to the next entity in the communications network. In effect, the unrecognized header causes the response to simply become a "pass through" message that gets passed on to the next entity in the network. Unlike other approaches that may, for example, utilize a downloaded piece of code to prevent time outs, the use of illusory content caused by an unrecognized header creates very little impact on the processing within the entities that do not recognize it. Upon reaching the client from whom the request was sent, the illusory content can prevent the client from timing out, again with little impact on the processing that may be occurring within the client.

Figure 5:
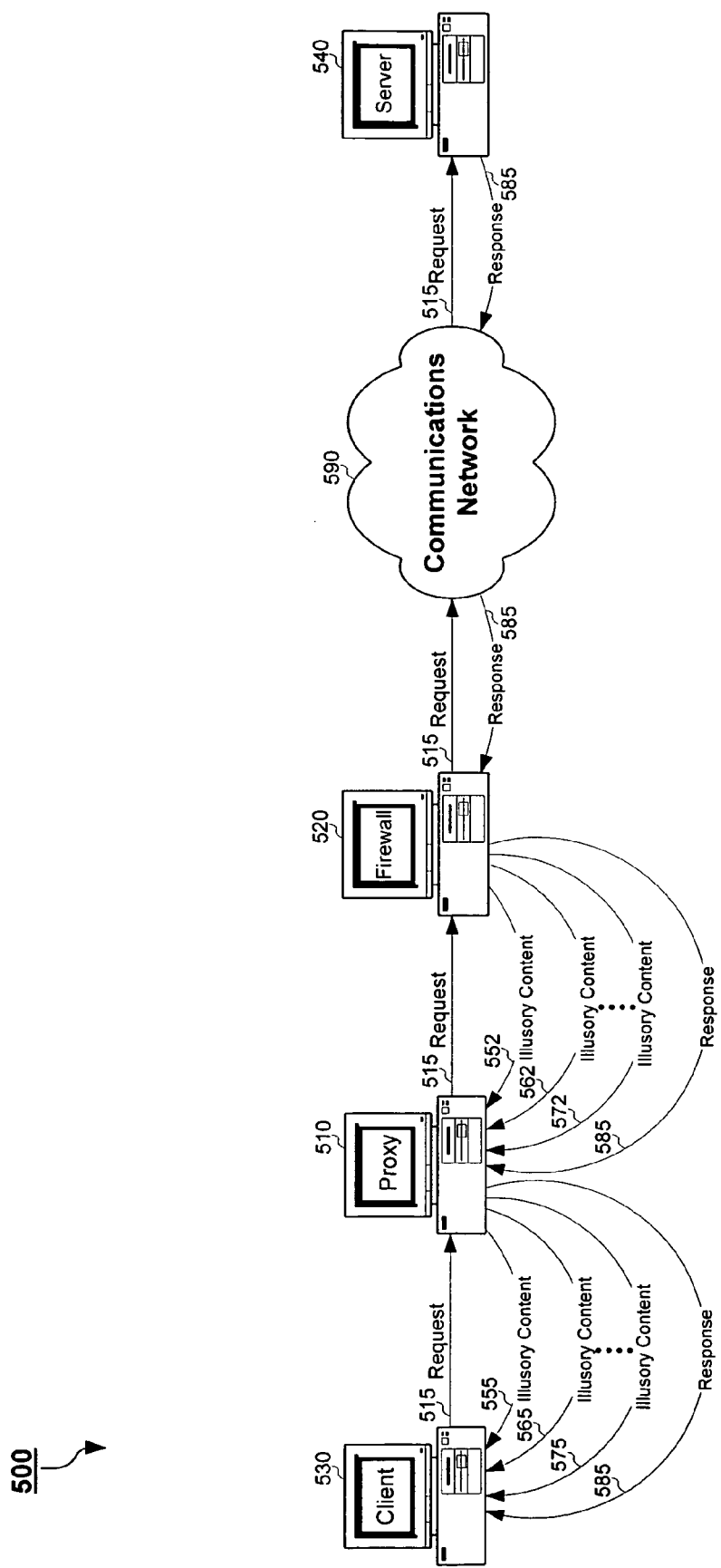
FIG. 5 depicts another embodiment of the present invention.

FIG. 5 depicts a block diagram of a use of the present invention showing a system 500 in which communications can occur between a client 530 and a server 540 over communications network 590. System 500 contains multiple agents for client 530, including proxy 510 and firewall 520. In general, client 530 can initiate a communications session with server 540 by sending request 515. For example, a user at client 530 might have found a new computer game program to run on the client.

Upon the user's decision to download a particular file by, for example, clicking on a download button on a Web page, request 515 can be generated in client 530 according to the well known GET method in the HTTP protocol. Once generated, request 515 can travel to proxy 510 which can then route the request to firewall 520. Firewall 520 can send the request on to communications network 590 (such as the Internet), after which the request can be received by server 540.

Server 540 can respond to the request by generating a response message. In particular, server 540 can determine if client 530 has met all necessary requirements for receiving the computer program which it requested. For example, client 530 might need to register in order to receive the program and, furthermore, might need to pay for the program that it requested. Upon making the determination that client 530 can receive the requested file, server 540 can package the requested file as required for HTTP transmission. Once properly packaged according to the requirements of the particular protocol, server 540 can transmit response 585, which can include the requested file, to client 530. Response 585 can then travel via communications network 590 to firewall 520.

Upon receiving response 585, firewall 520 may need to process the request further by, for example, decrypting the game file that might have been encrypted in response 585 or scanning the game file for viruses. If the time for the decryption or scanning process exceeds the threshold established for the particular software running on client 530, firewall 520 can send illusory content 552 to proxy 510. If proxy 510 recognizes the entity-header field included in illusory content 552, it will know that illusory content 555 needs to be passed on to client 530. Similarly, if proxy 510 does not recognize the entity-header field included in illusory content 552, it will still pass illusory content 555 on to client 530 as required by the HTTP protocol.

Since, in this embodiment, the invention addresses a time out issue, any intermediate agents (such as proxy 510) in the communications network must forward the illusory content in a reasonable amount of time such that the time out period will not expire. This reasonable amount of time may be chosen to accommodate any processing that might be done by the intermediate agent on the illusory content prior to being forwarded on to client 530.

In the event that firewall 520 cannot complete its processing prior to a time out that may occur subsequent to illusory content 552 being sent to proxy 510, firewall 520 can, in a similar manner, send enough instances of illusory content (shown as illusory content 562 through illusory content 572) such that a time out will not occur. Those additional instances of illusory content 562 through 572 can then cause proxy 510 to pass illusory content messages 565 through 575 to client 530. When firewall 520 finishes its processing, it can then send the actual response 585 to proxy 510 which can then send response 585 to client 530.

While the invention has been described in detail, including references to specific embodiments, it will be apparent to one skilled in the art that changes and modifications can be made to the invention without departing from the spirit and scope thereof. Thus, it is intended that the present invention cover the modifications and variations of this invention provided they come within the scope of the appended claims and their equivalents. In particular, while the specific embodiment described above involves the HTTP protocol, an equivalent approach could be taken for other protocols, such as the well known Simple Mail Transport Protocol (SMTP), the Network News Transfer Protocol (NNTP), or any other protocol that enables transmission of illusory content as described above.

What is claimed is:

1. A method of maintaining a data communications protocol session, the method comprising the steps of:
   sending a request from a client to a server over a data communications network;
   receiving said request in said server;
   sending a response to said request from said server to said client over said data communications network;
   receiving said response in an agent;
   determining if illusory content needs to be sent prior to sending said response;
   performing processing in said agent as a result of said response;
   if illusory content needs to be sent during said processing, sending one or more messages containing illusory content from said agent to said client;
   sending said response from said agent to said client; and
   receiving said response in said client;
   wherein said one or more messages containing said illusory content is sent for preventing a time out operation as a result of security processing.

2. A method for an agent to maintain a data communications protocol session, the method comprising:
   receiving a response in an agent from a server in a communications network, in response to a request from a client;
   determining if illusory content needs to be sent prior to sending said response;
   performing processing in said agent as a result of said response;
   if illusory content needs to be sent during said processing, sending one or more messages containing illusory content from said agent to said client; and sending said response from said agent to said client;
wherein said one or more messages containing said illusory content is sent for preventing a time out operation as a result of security processing.

3. A method as in claim 2, wherein said step of receiving a response further comprises receiving a file.

4. A method as in claim 3, wherein said file further comprises a computer program.

5. A method as in claim 3, wherein said file further comprises a document.

6. A method as in claim 2, wherein said step of performing processing further comprises searching a file.

7. A method as in claim 6, wherein said step of searching a file further comprises scanning said file for one or more computer viruses.

8. A method as in claim 6, wherein said step of searching a file further comprises scanning said file for one or more text phrases.

9. A method as in claim 2, wherein said step of performing processing further comprises encrypting a file.

10. A method as in claim 2, wherein said step of performing processing further comprises decrypting a file.

11. A method as in claim 2, wherein said step of performing processing further comprises creating a public key digital signature.

12. A method as in claim 2, wherein said step of performing processing further comprises verifying a public key digital signature.

13. A method as in claim 2, wherein said data communications protocol session further comprises an HTML session.

14. A method as in claim 13, wherein said step of sending one or more messages containing illusory content further comprises the steps of:
creating a copy of said response;
modifying said copy of said response by inserting an entity-header; and
transmitting said modified response to said client.

15. A computer readable medium containing computer program instructions for maintaining a data communications protocol session, said computer program instructions containing instructions for:
receiving a response from a server in a communications network, in response to a request from a client;
determining if illusory content needs to be sent prior to sending said response;
performing processing as a result of said response;
if illusory content needs to be sent during said processing, sending one or more messages containing said illusory content appropriate for said data communications protocol to said client; and
sending said response to said client;
wherein said one or more messages containing said illusory content is sent for preventing a time out operation as a result of security processing.

16. A system for maintaining a data communications protocol session, comprising:
a first computer operably coupled to one or more additional computers over said communications network, said first computer including software executable on said first computer and configured to:
receive a response from a server in a communications network, in response to a request from a client;
determine if illusory content needs to be sent prior to sending said response;
perform processing as a result of said response;
send one or more messages containing said illusory content appropriate for said data communications protocol to said client, if illusory content needs to be sent during said processing; and
send said response to said client;
wherein said one or more messages containing said illusory content is sent for preventing a time out operation as a result of security processing.

* * * * *